2,808,423

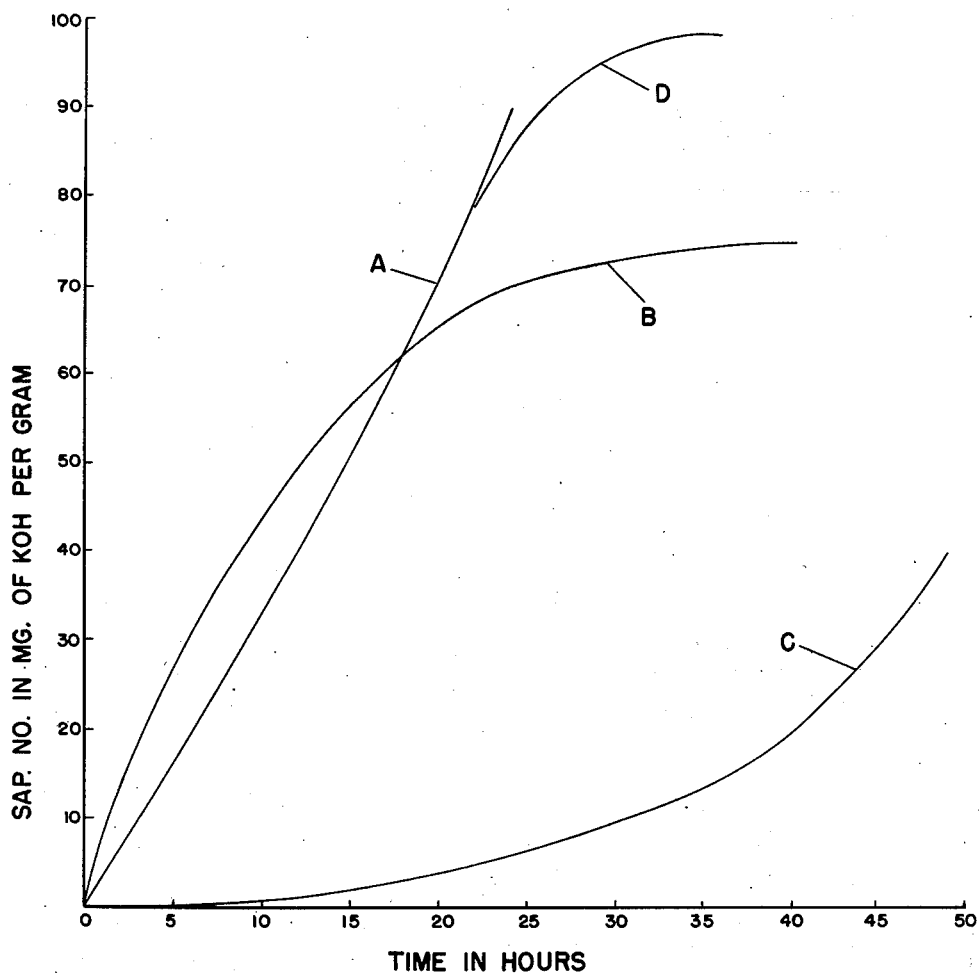
| | | |
|---|---|---|
| A | 0.02% Mg, 0.0005% Mn, | 260°F. |
| B | 0.02% Mn, | 280°F. |
| C | 0.04% Mg. | 260°F. |
| D | 0.04% Mn, | 280°F. |
INVENTORS.
SHIRLEY C. BARTLETT
HERBERT L. JOHNSON
ARCHIBALD P. STUART
BY
ATTORNEY

CATALYTIC PARTIAL OXIDATION OF HYDROCARBONS

Shirley C. Bartlett, United States Navy, and Herbert L. Johnson and Archibald P. Stuart, Media, Pa., assignors to Sun Oil Company, Philadelphia, Pa., a corporation of New Jersey Application September 3, 1953, Serial No. 378,264

4 Claims. (Cl. 260—451)

This invention relates to the catalytic partial oxidation of hydrocarbon materials, and more particularly to the use of a particular mixture of catalysts in the liquid-phase oxidation of petroleum hydrocarbons.

It is known in the art to catalytically partially oxidize petroleum hydrocarbons to obtain useful carboxylic acid products of oxidation. Various catalysts have been employed for such oxidation, including manganese salts of carboxylic acids, e. g. manganese naphthenate. Manganese salts provide generally quite satisfactory oxidation rates, but are subject to disadvantage in that they tend to cause discoloration of the petroleum material during the oxidation, and to cause the formation of insoluble materials which remain suspended in the petroleum material and interfere with subsequent uses of the oxidation products, such as in the preparation of soluble oils containing alkali metal soaps of the carboxylic acid products.

It has been proposed heretofore to employ a plurality of catalysts in a partial oxidation of petroleum, an alkaline earth metal salt of a carboxylic acid, e. g. magnesium or calcium naphthenate, being used as catalyst together with a heavy metal catalyst such as manganese naphthenate. However, in such oxidations, the manganese catalyst has been used in relatively high concentrations. This practice is subject to disadvantage in that manganese catalysts have a tendency to cause discoloration of the oxidation products and formation of insoluble materials.

According to the present invention, a catalytic, liquid-phase, partial oxidation of petroleum material is carried out in the presence of a manganese salt of a carboxylic acid and a magnesium or calcium salt of a carboxylic acid, the weight percent of manganese metal, based on the combined weights of manganese metal and alkaline earth metal in the oxidation mixture, being in the range from 0.1 to 8.0 weight percent, more preferably in the range from 1.0 to 4.0 weight percent. The total amount of catalyst in the oxidation mixture is such that the combined manganese metal and alkaline earth metal represent 0.01 to 0.1 weight percent, preferably 0.015 to 0.05 weight percent, of the oxidation charge.

It has been surprisingly found that, although the magnesium or calcium salts provide a very much slower oxidation rate, when used alone as oxidation catalysts, than are provided by manganese salts when used alone as oxidation catalysts, the catalysts according to the present invention provide just as rapid or more rapid an oxidation as when a manganese salt is used alone as an oxidation catalyst, or when a plurality of catalysts is used in which the weight percent of manganese metal based on the combined weights of manganese metal and alkaline earth metal is substantially greater than 8.0.

Furthermore, it has been found that the oxidation according to the invention produces a product which has a highly satisfactory color, and which is substantially free of insoluble materials such as are produced by prior art oxidations employing large amounts of manganese catalyst.

The petroleum materials which can be oxidized according to the invention include lubricating oil, foots oil, paraffin wax, microcrystalline wax, etc. Lower molecular weight fractions can also be oxidized according to the invention.

The oxidation can be conducted by contacting the petroleum material in liquid phase with any suitable free-oxygen containing gas, such as oxygen, air, ozone, ozonized air, etc. The oxidation temperature is preferably within the range from 200° F. to 300° F. The oxidation pressure is preferably atmospheric or moderately elevated pressure, preferably not exceeding 100 p. s. i. g.

The catalyst according to the present invention can be a salt of any suitable carboxylic acid, e. g. naphthenic, oleic, linoleic, abietic, etc., or acids obtained by a previous partial oxidation of petroleum material.

The invention will be further described with reference to the attached drawing which shows the results obtained in the process according to the invention as compared with results obtained in prior art operation. In the drawing, Line A shows a plot of saponification number against time in an oxidation at 260° F. of a petroleum foots oil with air in the presence of manganese naphthenate and magnesium naphthenate in amounts such that the oxidation charge contains 0.0005 weight percent of manganese and 0.02 weight percent of magnesium. Line B shows a similar plot for an oxidation under the same conditions except that the oxidation temperature was 280° F. and there was no magnesium in the oxidation charge, the amount of manganese naphthenate being such that the oxidation charge contained 0.02 weight percent of manganese. Line C shows a similar plot for an oxidation under the same conditions as in Line A except that there was no manganese in the oxidation charge, and the amount of magnesium naphthenate was such that the oxidation charge contained 0.04 weight percent of magnesium. The rate of contact of air with foots oil was 2 liters of air per liter of foots oil per minute in all oxidations. The foots oil used as oxidation charge in each oxidation had been obtained as by-prodct in the solvent de-oiling of a slack wax obtained in the solvent de-waxing of a solvent-refined lubricating oil.

The drawing shows that the catalyst according to the invention (Line A) provides superior results to those obtained with a catalyst containing only manganese (Line B) and with a catalyst containing only magnesium (Line C). The more rapid oxidation in the early stages of Line B is probably due to the higher oxidation temperature rather than to any superiority of the catalyst, and the superiority of the Line A catalyst is clearly seen in the later stages of the oxidation.

The results shown in the drawing are surprising since it would have been expected that the addition of a very small amount of manganese to a catalyst containing only half as much magnesium as the Line C catalyst would not produce any substantial improvement in the rate of oxidation; whereas, the drawing shows that the addition of only 0.0005% of manganese produced the much superior results of Line A.

Line D on the drawing shows the results of an oxidation conducted under the same conditions as in Line B except that the oxidation mixture contained 0.04% manganese instead of 0.02% manganese. Comparison of Runs B and D shows that the oxidation rate begins to level off at a lower saponification number in the run employing the smaller amount of manganese. Since reduction of the amount of catalyst reduces the saponification number which can be obtained, it is seen that a run with only 0.0005% manganese would level off at a quite low saponification number. Yet it was surprisingly found that only 0.0005% manganese gave the excellent results of Run A when combined with 0.02% magnesium.

In a run employing 0.0005% manganese and 0.02% calcium, a saponification number of 71 was obtained in 24 hours. The superiority of the Mn-Mg catalyst to the Mn-Ca catalyst is probably attributable to the fact that the molar concentration of calcium at the 0.02 weight percent level is less than the molar concentration of magnesium at that level.

In the runs with the catalysts containing both manganese and magnesium or calcium, the oxidation products were free of insoluble materials, whereas in the runs with manganese naphthenate only, substantial amounts of suspended solid materials were found in the oxidation products, indicating that the latter catalyst catalyzed the formation of insoluble oxidation products which were not formed in the oxidation with the manganese-magnesium or manganese-calcium catalyst.

In other experiments, it was found that catalysts according to the invention provide just as rapid oxidations as catalysts containing more than 8 parts of manganese per 92 parts of magnesium in mixtures of manganese naphthenate and magnesium naphthenate. It was also found that greater proportions of manganese in such mixtures produce more insoluble oxidation products and color bodies than lesser proportions of manganese.

The invention claimed is:

1. Process for partially oxidizing petroleum materials which comprises: contacting a charge stock selected from the group consisting of petroleum lubricating oil, petroleum wax, and mixtures of petroleum lubricating oil and wax in liquid phase wtih a free-oxygen containing gas under partial oxidation conditions in the presence of a catalyst comprising a manganese salt of a carboxylic acid and an alkaline earth metal salt selected from the group consisting of magnesium salts of carboxylic acids and calcium salts of carboxylic acids, the weight percent of manganese based on the combined weights of manganese metal and alkaline earth metal in the catalyst being in the range from 0.1 to 8.0 weight percent, and the sum of the weight percents of manganese metal and alkaline earth metal based on the oxidation charge being in the range from 0.01 to 0.1 weight percent, thereby to obtain a more rapid increase in saponification number than that obtained using a catalyst consisting essentially of either one of said salts in amount approximately equal to said sum.

2. Process according to claim 1 wherein said alkaline earth metal is magnesium.

3. Process according to claim 1 wherein said alkaline earth metal is calcium.

4. Process according to claim 1 wherein the ratio of manganese to alkaline earth metal in said catalyst is about 5:200.

References Cited in the file of this patent

UNITED STATES PATENTS

| | | |
|---|---|---|
| 1,874,322 | Luther et al. | Aug. 30, 1932 |
| 1,981,384 | Friedolsheim et al. | Nov. 20, 1934 |
| 2,008,490 | Dietrich et al. | July 16, 1935 |
| 2,704,294 | Morgan et al. | Mar. 15, 1955 |
| 2,705,241 | McKinley et al. | Mar. 29, 1955 |